C. S. STEARNS.

Improvement in Rolls for Leather Splitting Machines.

No. 123,589. Patented Feb. 13, 1872.

Witnesses,

Inventor,
Caleb S. Stearns

UNITED STATES PATENT OFFICE.

CALEB S. STEARNS, OF MARLBOROUGH, MASSACHUSETTS.

IMPROVEMENT IN ROLLS FOR LEATHER-SPLITTING MACHINES.

Specification forming part of Letters Patent No. 123,589, dated February 13, 1872; antedated January 27, 1872.

*To all whom it may concern:*

Be it known that I, CALEB S. STEARNS, of Marlborough, in the county of Middlesex and State of Massachusetts, have invented an Improved Elastic Roll for Machines for Splitting Leather and for other purposes, of which the following is a full, clear, and exact description, reference being had to the accompanying drawing making part of this specification, in which—

Figure 1:
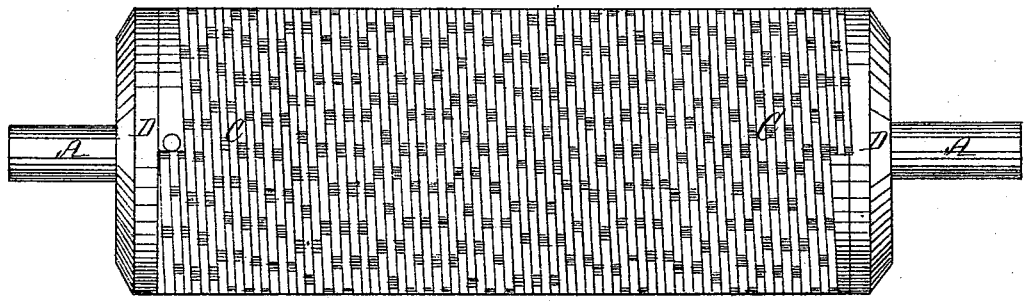
Figure 2:
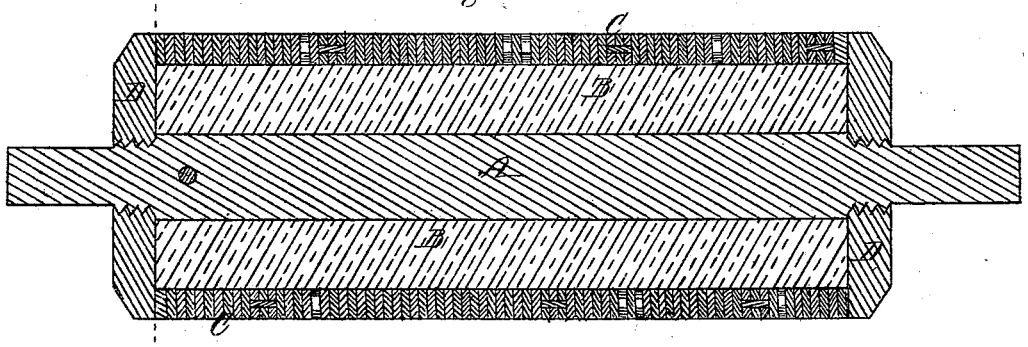
Figure 3:
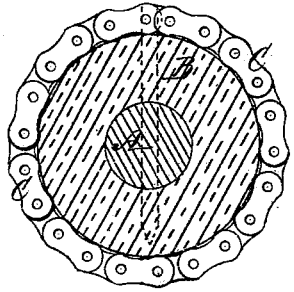

Figure 1 is a plan of my improved elastic roll. Fig. 2 is a longitudinal vertical section through the center of the same. Fig. 3 is a transverse vertical section through the same on the line $x\ x$ of Fig. 2.

The feed-rolls used in machines for splitting leather, as usually constructed, are composed of metal; and, as the surface of a metal roll is inelastic, when the leather is of unequal thickness in the line or direction of the length of the roll, a portion only of its surface comes into contact therewith; consequently an unequal pressure is exerted by the feed-roll upon the leather, causing it to wrinkle or double up, which prevents the "grain" from being cut of a uniform thickness, and renders it liable to be injured or spoiled by the knife.

This invention has for its object to overcome these difficulties; and consists in an elastic roll having its surface covered with a continuous band formed of chain-links wound spirally, or separate and independent rings composed of chain-links placed side by side; by which construction I am enabled to produce a roll having an elastic metal surface, which will adapt itself exactly to the inequalities of the surface of the leather, which is thus prevented from wrinkling or doubling up, and is fed forward to the knife in such manner as to insure the "grain" being cut of uniform thickness throughout.

To enable others skilled in the art to understand and use my invention, I will proceed to describe the manner in which I have carried it out.

In the said drawing, A represents a metallic shaft which is covered with vulcanized rubber or other suitable elastic material, B, of the required thickness, which is prevented from turning thereon by ribs or projections, or in any other suitable manner. C is a chain, which is composed of links riveted together, forming what is known as a "machine-chain;" and this chain is wound spirally upon the surface of the elastic material B, so as to entirely cover the surface thereof as seen in Fig. 1, the ends of the chain being securely fastened in place in any suitable manner. At each end of the roll thus formed is a metallic disk or end piece, D, which fits over a screw-thread upon the shaft A and is screwed up tightly in place against the elastic material and the last coil of the chain, which is thus prevented from being displaced, the diameter of each disk D corresponding to that of the roll when the chain is wound thereon. Instead of the chain being formed in one continuous length and wound spirally, as above described, separate rings formed of links may be placed side by side upon the elastic portion B, if preferred, the rings being securely fastened so as to prevent them from turning independently of the surface upon which they are placed.

The above-described elastic roll, when used for machines for splitting leather, is provided with a fluted surface, so as to cause it to hold the leather firmly and prevent it from slipping as it is fed up to the knife, and it will be seen that the elastic metal surface of the roll will readily conform to any inequalities in the surface of the leather, which is thus prevented from wrinkling or "cockling," and is fed forward uniformly, which insures the cutting of the "grain" of equal thickness throughout, as desired.

My improved elastic roll may be used for any purpose for which it may be found applicable, and may have its surface fluted, milled, or roughened, as desired.

It is particularly designed, however, for machines for splitting leather, for the reason that its metallic surface not only yields, to conform to the inequalities of the surface of the leather, but also possesses the required strength, rigidity, and durability when fluted or roughened, which would not be the case if the surface of the roll was composed of rubber or other elastic material.

Claim.

What I claim as my invention, and desire to secure by Letters Patent, is—

The within-described elastic roll, the surface of which is composed of chain-links, substantially in the manner and for the purpose set forth.

Witness my hand this 3d day of July, A. D. 1871.

CALEB S. STEARNS.

In presence of—
P. E. TESCHEMACHER,
W. J. CAMBRIDGE.